United States Patent
Minakuchi et al.

[11] Patent Number: 5,844,707
[45] Date of Patent: Dec. 1, 1998

[54] SCANNING OPTICAL DEVICE

[75] Inventors: Tadashi Minakuchi; Masahiro Oono; Mitsunori Iima; Hiroshi Kanazawa, all of Tokyo, Japan

[73] Assignee: Asahi Kogaku Kogyo Kabushiki Kaisha, Tokyo, Japan

[21] Appl. No.: 791,978

[22] Filed: Jan. 31, 1997

[30] Foreign Application Priority Data

Jan. 31, 1996 [JP] Japan .................................. 8-037266
Feb. 7, 1996 [JP] Japan .................................. 8-045442

[51] Int. Cl.$^6$ .................................................. G02B 26/08
[52] U.S. Cl. .................. 359/204; 359/196; 359/212; 359/216; 359/636; 347/236; 347/246; 250/205
[58] Field of Search .................................. 359/196, 197, 359/204, 212, 216, 217, 218, 636; 347/236, 243, 246, 256, 260; 250/205

[56] References Cited

U.S. PATENT DOCUMENTS 4,180,822 12/1979 Hudson et al. ........................... 347/246
5,270,736 12/1993 Inoue et al. ............................. 347/246
5,760,944 6/1998 Minakuchi et al. ..................... 359/211

FOREIGN PATENT DOCUMENTS 2-198413  8/1990  Japan .
2-240617  9/1990  Japan .
2-140510  11/1990  Japan .
5-93878   4/1993  Japan ..................................... 359/204

Primary Examiner—James Phan
Assistant Examiner—Darren E. Schuberg
Attorney, Agent, or Firm—Greenblum & Bernstein, P.L.C.

[57] ABSTRACT

A scanning optical device that includes a laser source that emits a laser beam; a deflector for deflecting a laser beam to form a scanning beam spot on an image surface; a beam splitter, between the laser source and the deflector, and a sensor positioned in a predetermined position relative to the beam splitter. In particular, the beam splitter includes a reflective area in which the laser beam from the laser source is reflected and a transmitting area that is distinct from the reflective area through which the laser beam is transmitted. One of the reflected laser beam or transmitted laser beam is a main beam to be deflected by the deflector and the other is a monitor beam to be detected by the sensor.

21 Claims, 9 Drawing Sheets

SCANNING OPTICAL DEVICE

BACKGROUND OF THE INVENTION

The present invention relates to a scanning optical device used for a laser beam printer or the like. In particular, the present invention relates to a scanning optical device in which the laser power is monitored.

In a laser printer, the energy of a beam spot formed on a photoconductive drum determines the density of the electrostatic latent image. As such, the power of the laser beam must be controlled to maintain a predetermined magnitude in order to keep the density of the images formed consistent.

Conventionally, in laser printer systems, the laser beam emitted from a laser source is divided into a monitor beam and a main beam by a half mirror. The light intensity of the main beam is then controlled by detecting the light intensity of the monitor beam.

However, the transmittance or reflectance of a half mirror is polarization dependent. In other words, the balance between the light intensity of the main beam and that of the monitor beam, when split by a half mirror, changes according to the state(s) of polarization of the incident laser beam.

Therefore, when the balance between the intensities of the main beam and the monitor beam is lost, control based on the light intensity of the monitor beam fails to keep the light intensity of the main beam at the predetermined level.

This problem is particularly significant in a scanning optical device utilizing optical fibers because the transmission of the laser beam through the optical fibers changes the plane of vibration of the linearly polarized laser beam.

SUMMARY OF THE INVENTION

It is therefore an object of the present invention to provide a scanning optical device that can accurately control the main beam based on the monitor beam.

According to an aspect of the present invention, there is provided a scanning optical device that includes a laser source that emits a laser beam; a deflector for deflecting and scanning said laser beam; a beam splitter, between the laser source and the deflector, and a sensor positioned in a predetermined position relative to the beam splitter. In particular, the beam splitter includes a reflective area in which the laser beam from the laser source is reflected and a transmitting area that is distinct from the reflective area through which the laser beam is transmitted. One of the reflected laser beam or transmitted laser beam is a main beam to be deflected by the deflector and the other is a monitor beam to be detected by the sensor. The sensor is positioned to receive the monitor beam and detects the intensity of the monitor beam.

Preferably, both the reflectivity of the reflective area and the transmittance of the transmitting area are larger than 90 percent.

In a particular case, the scanning optical device may further include a controller for controlling the power of the laser beam emitted from the laser source in accordance with the intensity of the monitor beam detected by the sensor.

In a further particular case, the reflected laser beam may be the main beam and the transmitted laser beam may be the monitor beam.

In yet a further particular case, the transmitting area may be formed as an opening through which the laser beam passes.

In yet a further particular case, the transmitting area may be formed in a central portion of the beam splitter and the reflecting area may be formed to surround the transmitting area. In this case, the transmitting portion may have a circular shape.

In yet a further particular case, the transmitting area may have a rectangular shape of which the long sides extend along a main scanning direction. Alternatively, the long sides may extend along an auxiliary scanning direction.

In yet a further particular case, the scanning optical device may further include an optical fiber for transmitting the laser beam emitted from the laser source to the beam splitter.

In yet a further particular case, the laser source may include a plurality of laser sources emitting laser beams. In this case, the scanning optical device may further include a plurality of optical fibers for transmitting the laser beams emitted from the plurality of laser sources to the beam splitter.

In yet a further particular case, the scanning optical device may further include a scanning lens for converging the laser beam deflected by the deflector.

According to another aspect, a scanning optical device includes a laser source that emits a laser beam; a polygon mirror for deflecting and scanning the laser beam; a beam splitter, between the laser source and the deflector; and a sensor, positioned in a predetermined position relative to the beam splitter. In particular, the beam splitter divides the laser beam into a reflecting laser beam and a transmitting laser beam without being affected by the polarization of the laser beam. One of the reflected laser beam or the transmitted laser beam is a main beam to be deflected by the polygon mirror and the other is a monitor beam to be detected by the sensor. The sensor detects the intensity of the monitor beam.

DETAILED DESCRIPTION OF THE PREFERRED EMBODIMENTS

An embodiment of a scanning optical device is directed to a multi-beam scanning optical device that scans a plurality of laser beams across a predetermined angle producing eight scanning lines per scan on a surface, such as the surface of a photoconductive member.

Figure 1:
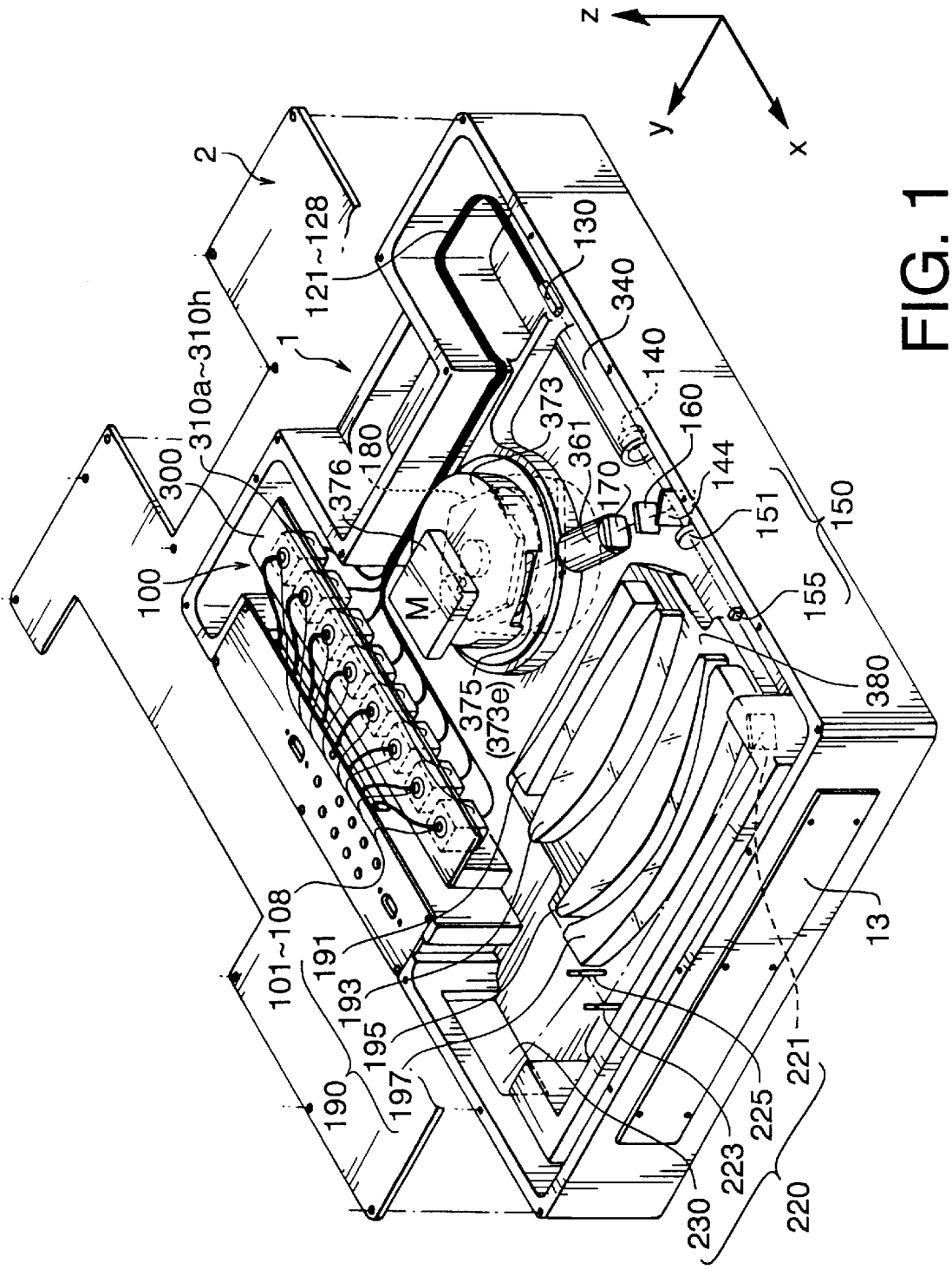
FIG. 1 is a perspective view showing a scanning optical device.
Figure 2:
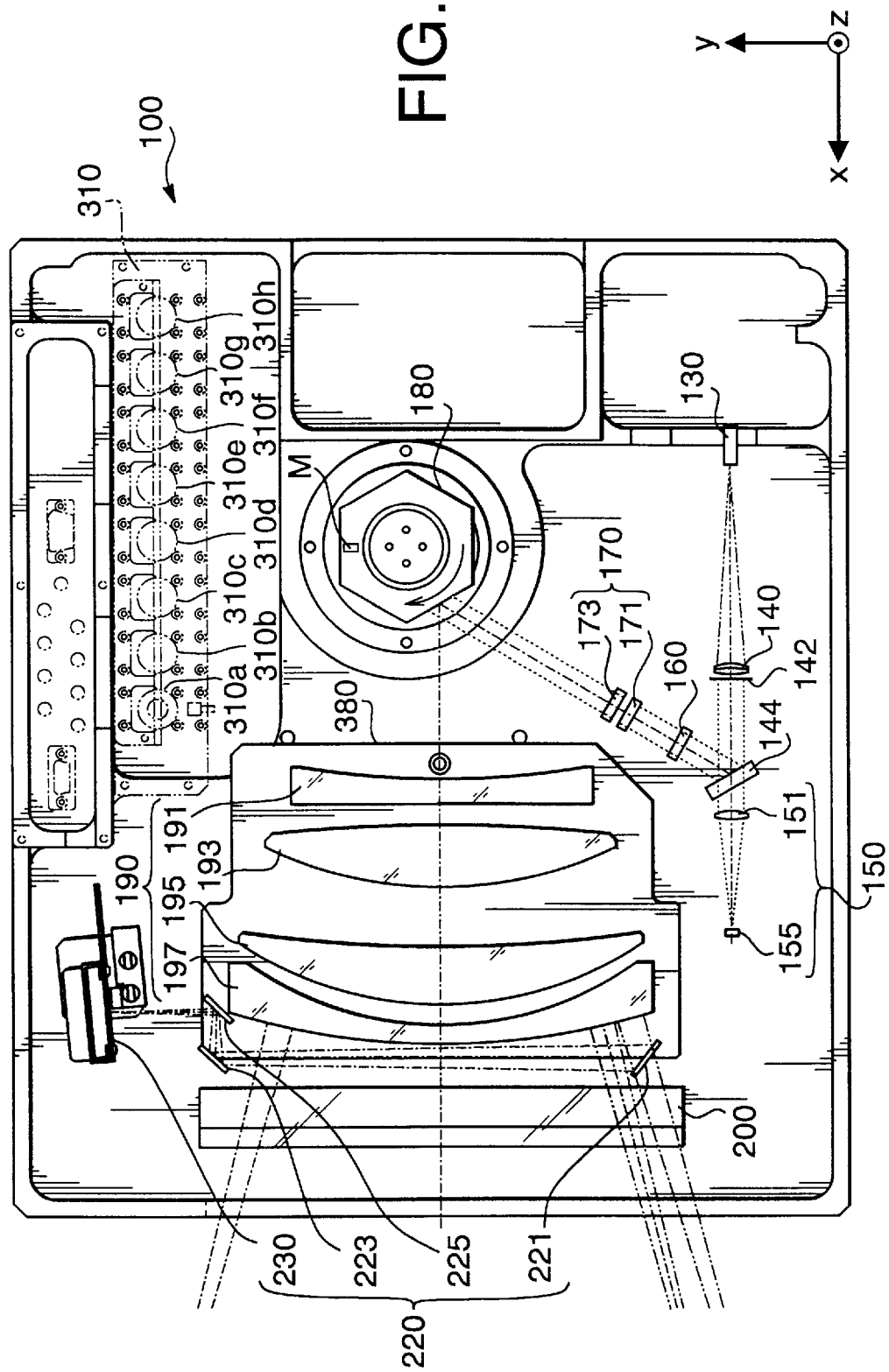
FIG. 2 is a plan view of the scanning optical device shown in FIG. 1 in a main scanning direction.

The structure of the scanning optical device is first described with reference to FIGS. 1 to 4. FIG. 1 shows a perspective view of the scanning optical device, FIG. 2 shows a plan view thereof, FIG. 3 shows a cross-sectional view thereof, and FIG. 4 shows an optical configuration of the scanning optical device.

Figure 3:
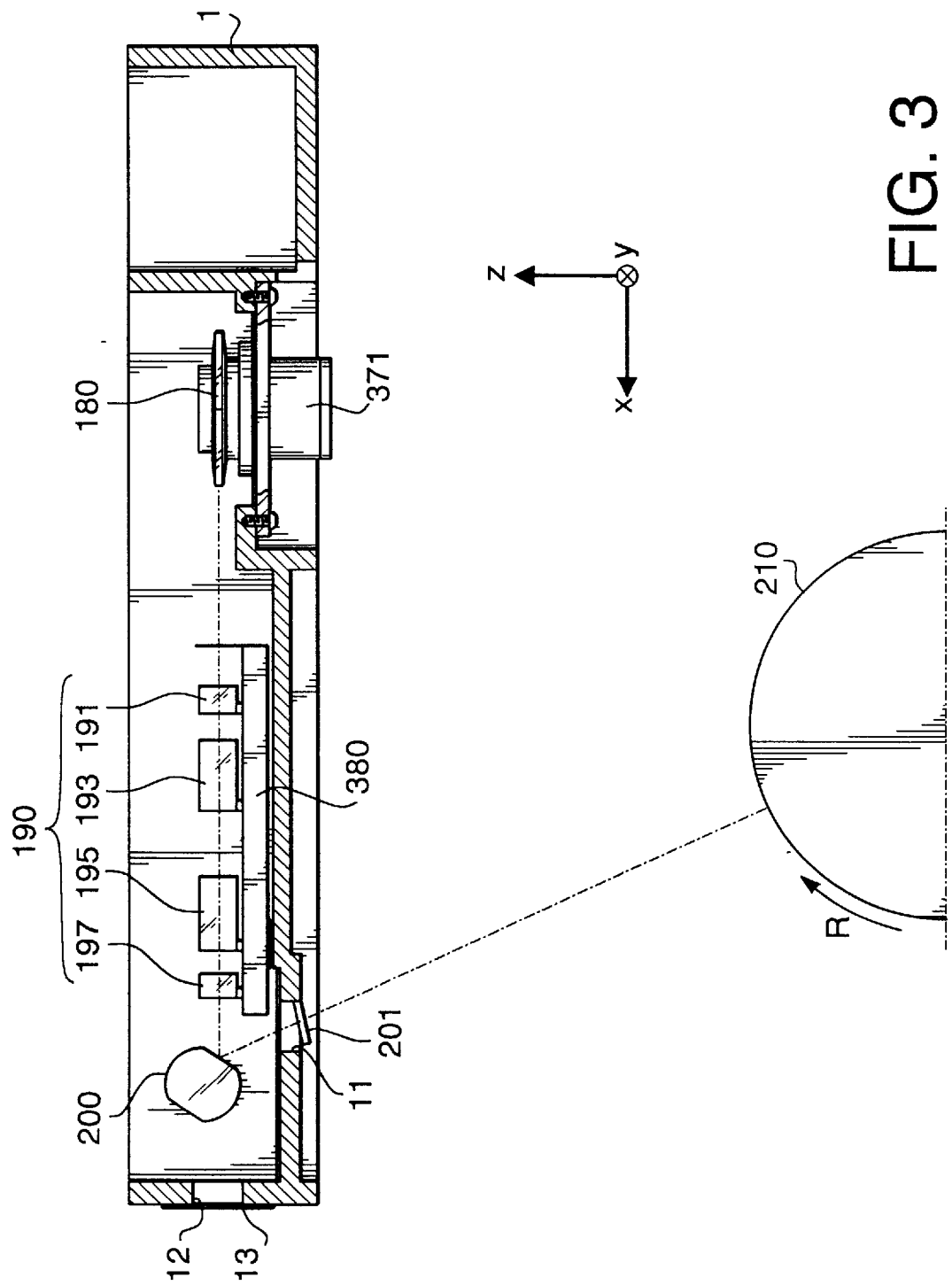
FIG. 3 is a cross-sectional view of the scanning optical device shown in FIG. 1 in an auxiliary scanning direction.
Figure 4:
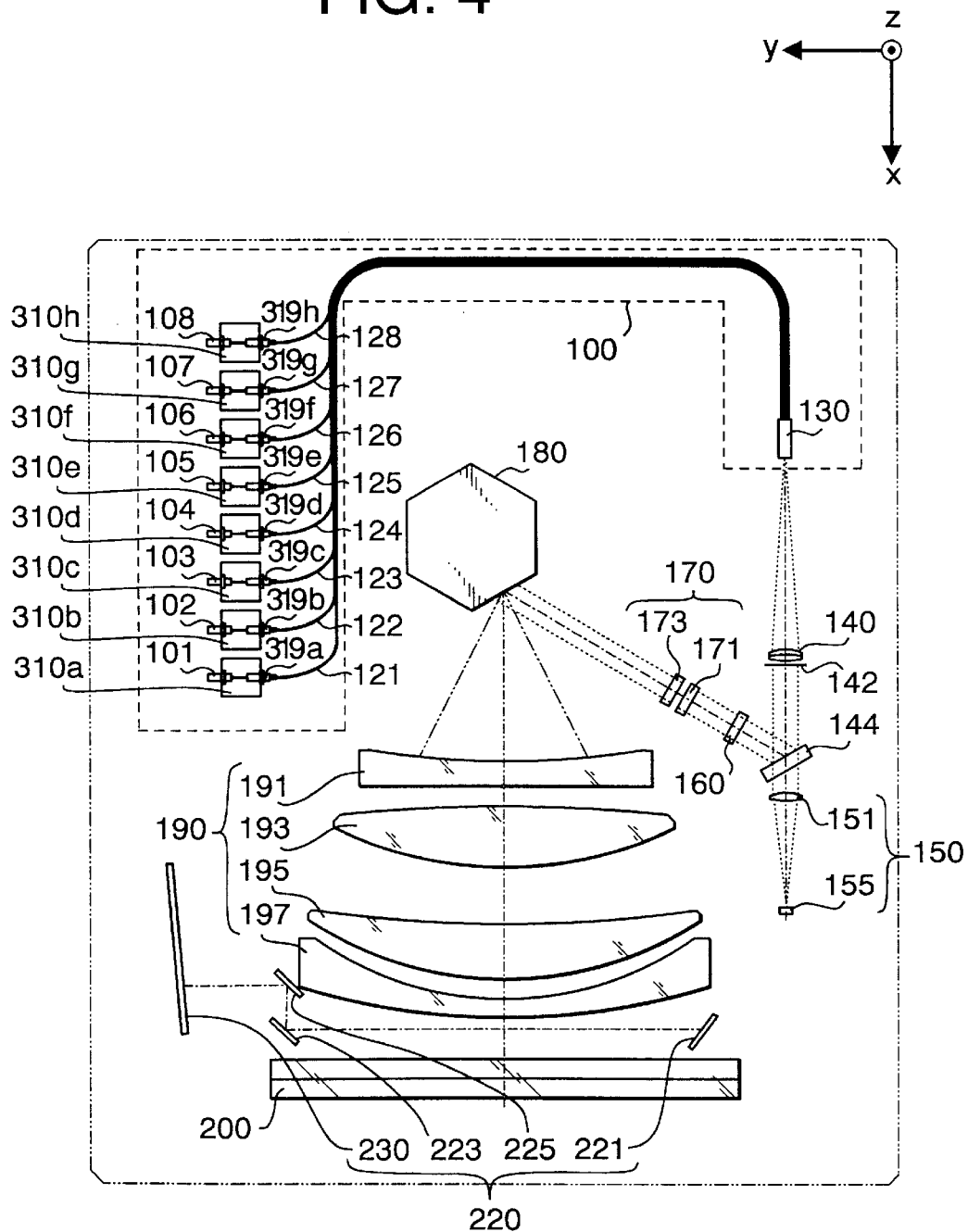
FIG. 4 shows the optical configuration of the scanning optical device of FIG. 1 in the main scanning direction.

As shown in FIGS. 3 and 4, the scanning optical device comprises a light transmission device 100, a polygon mirror 180, and an fθ lens 190 (scanning lens). In operation, eight laser beams are emitted from the light transmission device 100, deflected (scanned) by the polygon mirror 180, pass through the fθ lens 190, to form eight scanning lines on a photoconductive surface, such as a photoconductive drum 210.

Throughout this specification, a "main scanning direction" is defined as a direction in which a laser beam scans across the surface of a photoconductive member, and an "auxiliary scanning direction" is a direction in which the photoconductive member is translated or rotated to position the member for a subsequent main scan. The main scanning and auxiliary scanning directions are perpendicular to one another, and are both perpendicular to the optical axes of lenses guiding the laser beams. Since a laser beam typically is reflected or "folded" several times in the transmission from the laser source to a photoconductive member, the main scanning and auxiliary scanning directions are not absolute, but are generally referred to with reference to the optical axis at a particular point along the optical path.

In this specification, an XYZ coordinate system is defined in each of FIGS. 1 through 4. The X axis is an axis parallel to the optical axis of the fθ lens 190, and the Y and Z axes are orthogonal to each other in the plane perpendicular to the X axis. The Y axis is parallel with the main scanning direction, and the Z axis is parallel with the auxiliary scanning direction.

As shown in FIG. 1, the scanning optical device further includes an open casing 1. In use, the top opening of the casing 1 is closed by an upper cover lid 2.

As shown in FIG. 4, the light transmission device 100 includes eight semiconductor lasers 101 through 108; eight laser blocks 310a through 310h (each attached to a supporting substrate 300), corresponding to each of the lasers 101 through 108; eight silica glass optical fibers 121 through 128, also corresponding to each of the lasers 101 through 108; and a fiber alignment block 130. Each of the lasers 101 through 108 is mounted in the corresponding laser block 310a through 310h such that the respective laser beams are guided to enter the corresponding optical fibers 121 through 128. Furthermore, the incident end portions of the optical fibers 121 through 128 are retained by fiber supporting members 319a through 319h fixed at the laser blocks 310a through 310h, respectively. The fiber alignment block 130 secures the exit end portions of the optical fibers 121 through 128 for aligning the eight optical fibers 121 through 128 such that eight point laser sources are formed in a straight line.

A diverging laser beam emitted from the fiber alignment block 130 is collimated by a collimator lens 140 held by a cylindrical collimator lens barrel 340, and is directed through an aperture 142. The aperture 142 defines a rectangular opening, longer in the main scanning direction, designed to regulate the beam shape (in the main scanning and auxiliary scanning directions) of the laser beam emitted from the collimate lens 140.

The laser beam that passes through the aperture 142 is directed to a beam splitter 144. The beam splitter 144 splits the laser beam causing a part of the laser beam to be transmitted as a monitor beam and the remaining part to be reflected as a main beam. The transmissivity of the beam splitter 144 (i.e., the amount of light transmitted as a monitor beam) is, for example, from 5 to 10 percent.

The monitor beam is directed into an automatic power control (APC) sensor system 150. The APC sensor system 150 includes a collective lens 151 for converging the monitor beam and an APC light receiving element 155.

The APC light receiving element 155 detects the light energy of the monitor beam and the output of the light receiving element 155 is used for feedback control of the output of the semiconductor lasers 101 through 108.

The main beam reflected by the beam splitter 144 is transmitted through a dynamic prism 160. The dynamic prism 160 is rotatably disposed about an axis orthogonal to the optical axis to control the spot position in the auxiliary scanning direction on the image plane. That is, the dynamic prism 160 is preferably a wedge prism, supported to be rotatable about the main scanning direction in order to deviate the direction of the main beam in the auxiliary scanning direction. The dynamic prism 160 corrects changes in the position of image spots (in the auxiliary scanning direction) on the scanning plane resulting from either or both of tilting error of the reflecting surfaces of the polygon mirror 180 and unevenness of rotation of a photoconductive drum 210 (shown in FIG. 3, and described later).

The main beam transmitted through the dynamic prism 160 forms a linear image in the vicinity of the mirror surface of the polygonal mirror 180 by means of a cylindrical lens 170. The cylindrical lens 170 has positive power only in the auxiliary scanning direction. As shown in FIG. 1 and 2, the cylindrical lens 170 is supported by a cylindrical lens barrel 361 and is composed of two lenses 171, 173 having positive and negative power, respectively, in the auxiliary scanning direction.

As shown in FIG. 3, the polygonal mirror 180 is driven by a mirror motor 371 (fixed in the casing 1), and rotates clockwise from the viewpoint of FIG. 2 (shown by an arrow). Furthermore, as shown in FIG. 1, the polygonal mirror 180 is isolated from the atmosphere by a cup-like polygon cover 373 in order to prevent the generation of sound due to rotations, and to avoid damage to the mirror surface from collisions with dust or debris in the air.

An optical path opening 373e is formed at the side of the polygon cover 373, and a cover glass 375 is fitted in the optical path opening 373e. The main beam transmitted through the cylindrical lens 170 enters the polygon cover 373 through the cover glass 375, is deflected by the polygonal mirror 180, and is directed outward, passing again through the cover glass 375. Furthermore, a mark M is attached to or marked on the top surface of the polygonal mirror 180 and a sensor block 376 containing a sensor for detecting the mark M is provided on the top surface of the polygon cover 373.

A polygonal mirror may have facial errors (shape errors) on the reflection surfaces that are produced during manufacturing. This manufacturing error is often uneven between the respective reflection surfaces (i.e. between and among each side of the polygonal mirror). In order to compensate for these facial errors, the error quantity of each surface of the polygonal mirror 180 can be measured and stored in a memory (not shown) during the manufacture of the scanning optical device. Then, by distinguishing which reflection surface of the polygonal mirror 180 is currently being used for scanning, for example, according to the output of the sensor in the sensor block 376, at least the beam position and beam intensity may be corrected according to the error quantity inherent to each of the reflection surfaces of the polygonal mirror 180.

As shown in FIG. 3, the main beam reflected by the polygonal mirror 180 passes through the fθ lens 190 (an image forming optical system) and is reflected by a fold-over mirror 200 to the photoconductive drum 210, forming eight beam spots. The beam spots scan according to rotations of the polygonal mirror 180, forming eight scanning lines per scan on the photoconductive drum 210. The photoconductive drum 210 is driven and rotated in the direction of the arrow R in synchronization with the scanning of the beam spots, to form an electrostatic latent image on the photoconductive drum 210. The latent image is then transferred onto a sheet of paper (not shown) by a known electronic photography process.

The fθ lens 190 includes first, second, third and fourth lenses 191, 193, 195, 197 arranged in order from the polygonal mirror 180 side to the fold-over mirror 200 side, having negative, positive, positive and negative power in both the main scanning and auxiliary scanning directions, respectively. The first, second, third and fourth lenses 191, 193, 195, 197 are arranged on a lens base 380. The combination of first, second, third and fourth lenses 191, 193, 195, 197 in the fθ lens 190 operates such that the laser beam that was linearly formed as an image in the auxiliary scanning direction at the polygonal mirror 180 is elliptically formed as an image on the photoconductive drum 210.

The first lens 191 of the fθ lens 190 is a negative lens having a concave spherical surface on the polygonal mirror 180 side, and a cylindrical surface having negative power only in the auxiliary scanning direction on the fold-over mirror 200 side. The surfaces of the lens are designed such that the first lens 191 has a comparatively large negative (i.e. more negative) power in the auxiliary scanning direction and a comparatively small negative power in the main scanning direction.

The second lens 193 of the fθ lens 190 is a meniscus-shaped toric lens having a convex-spherical surface on the polygonal mirror 480 side and a convex toric surface on the fold-over mirror 200 side. The surfaces of the lens are designed such that the second lens 193 has a comparatively large positive (i.e. more positive) power in the auxiliary scanning direction and a comparatively small positive power in the main scanning direction.

The third lens 195 is a positive meniscus lens having two spherical surfaces.

The fourth lens 197 is a negative meniscus lens having two spherical surfaces.

The main beam transmitted through the fθ lens 190 is detected by a synchronization sensor system 220 at each scan (i.e. for each surface of the polygonal mirror 180). The synchronization sensor system 220 is positioned in the optical path between the fourth lens 197 of the fθ lens 190 and the fold-over mirror 200. The synchronization sensor system 220 includes first, second, and third mirrors 221, 223, 225, and a synchronization light sensor 230 which receives the laser beams reflected by the mirrors 221, 223, 225. The first mirror 221 is positioned in the optical path from the polygonal mirror 180 to the fold-over mirror 200 at one edge of the main scanning range, but outside of a predetermined image forming range (not shown). The second and third mirrors 223 and 225 are positioned outside of the optical path on an opposite side to the first mirror 221. The synchronization light sensor 230 is disposed at a position optically equivalent to the position on the surface of the photoconductive drum 210 at which scanning occurs. Thus, in each main scan, the eight laser beams are sequentially reflected by the first, second, and third mirrors 221, 223, 225 and strike the synchronization light sensor 230. A signal or signals output by the synchronization light sensor 230 are then used to synchronize the transfer of image data equivalent to one scan from a drive circuit (not shown) to drive the semiconductor lasers 101 through 108 according to the image data.

An image forming opening 11, which permits the main beam (including the eight individual laser beams) reflected by the fold-over mirror 200 to be transmitted to the photoconductive drum 210, is formed in the casing 1. A cover glass 201 is attached to the image forming opening 11.

An inspection opening 12 is formed behind the fold-over mirror 200. The inspection opening 12 is used when adjusting optical elements after the optical elements (excluding the fold-over mirror 200) are assembled. As shown in FIG. 3, the inspection opening 12 is covered by a cover plate 13 in normal use.

Figure 5:
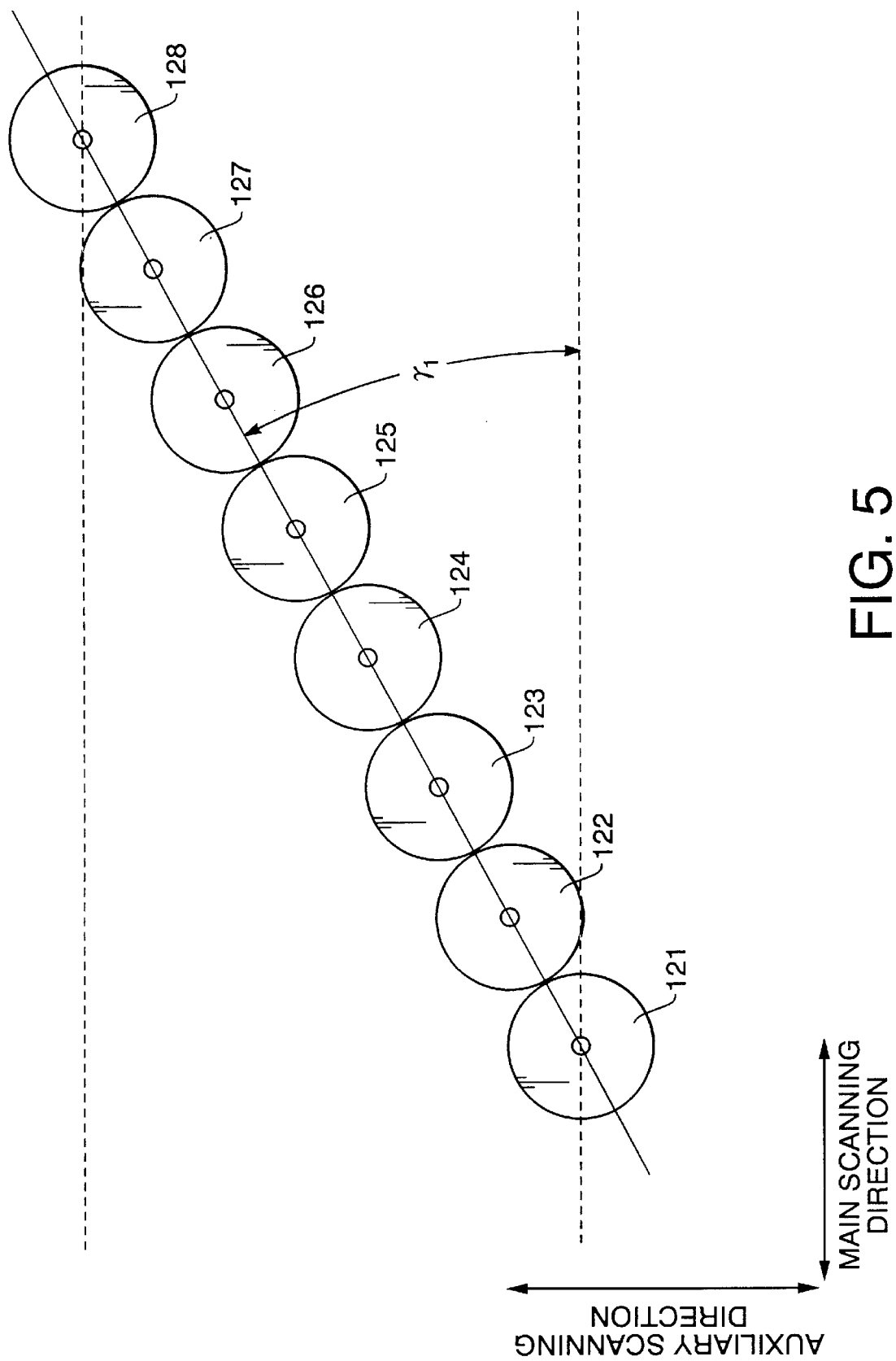
FIG. 5 is an explanatory view showing an array of fibers.

As shown in FIG. 5, the optical fibers 121 through 128, retained at the fiber alignment block 130, are arranged so that their center axes are in a straight row. The fiber alignment block 130 is retained by a holder (not shown) and is diagonally set, so that the straight line connecting the center axes of the fibers 121 through 128 forms a predetermined angle γ1 with respect to the main scanning direction. At the predetermined angle γ1, the beam spots on the photoconductive drum 210 form an array, separated from each other by a predetermined distance in the main scanning direction and in the auxiliary scanning direction.

Figure 6:
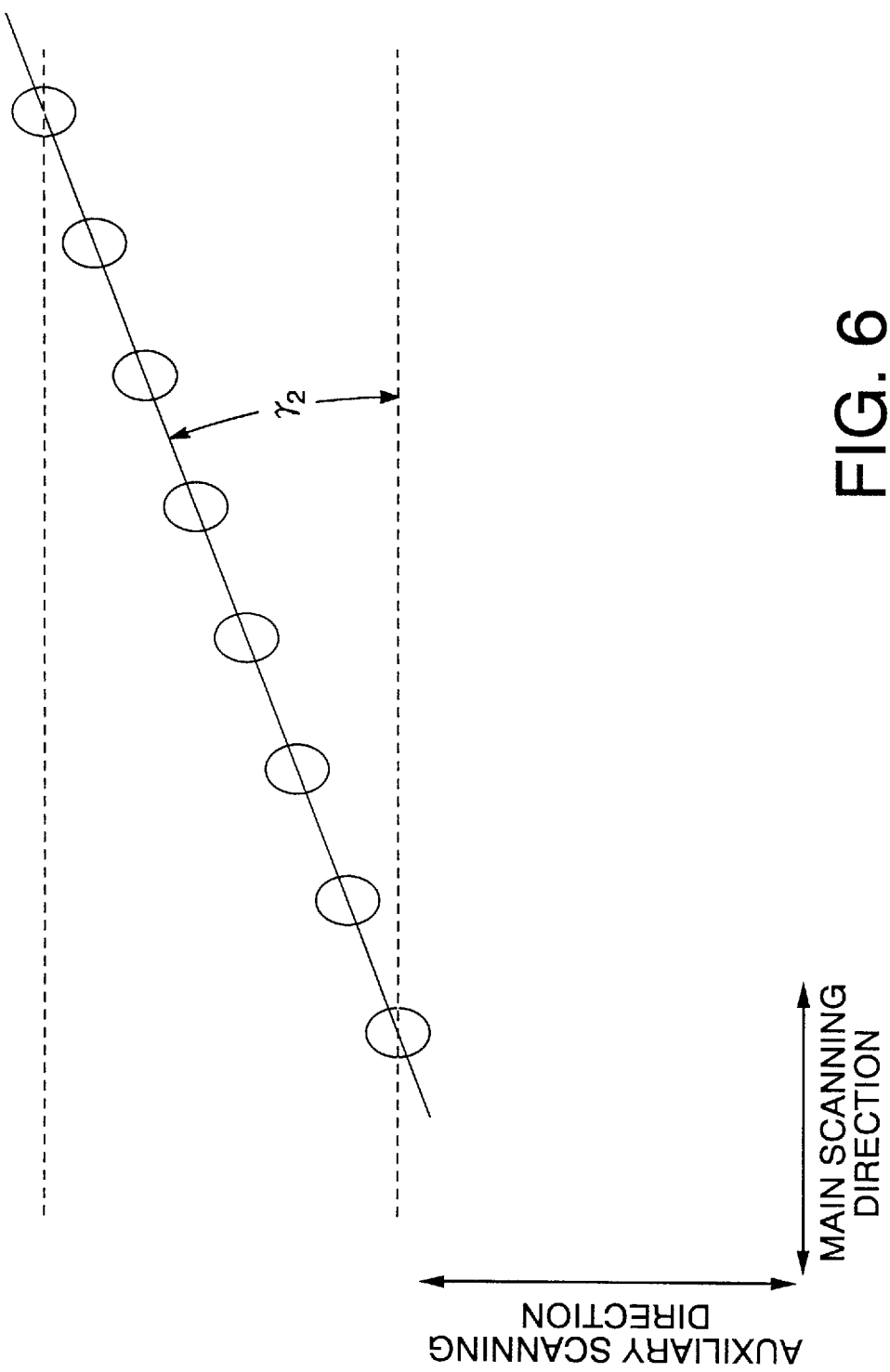
FIG. 6 is an explanatory view showing an array of beam spots on a photoconductive drum.

FIG. 6 shows the array of beam spots formed on the photoconductive drum 210. If the optical fibers 121 through 128 (corresponding to object points) are arrayed as shown in FIG. 5, the beam spots form with their centers in a straight line that forms a predetermined angle γ2 with respect to the main scanning direction. In this way, the centers of the beam spots are separated by a predetermined distance in the auxiliary scanning direction, such that scan lines formed in the main scanning direction can be slightly overlapped.

The beam splitter 144 will now be explained with reference to FIGS. 7 to 13.

Figure 7:
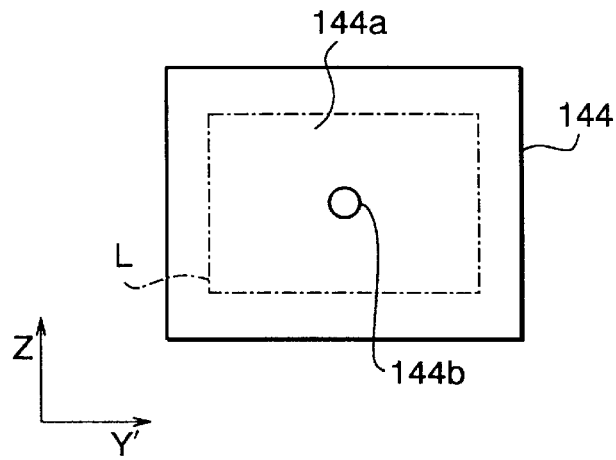
FIG. 7 is a front view of a beam splitter of a first embodiment.

As shown in FIG. 7, the beam splitter 144 includes a reflective area 144a in which the laser beams from the transmission optical system 100 (laser source) are reflected and a transmitting area 144b through which the laser beams are transmitted. As described below, the reflectivity of the reflective area 144a and the transmittance of the transmitting area 144b should be greater than approximately 90 percent. In this example, the reflective area 144a is formed as a rectangular mirror and the transmitting area 144b is formed as a opening through which the laser beams pass. Thus, the reflectivity of the reflective area 144a is almost equal to 100 percent and the transmittance of the transmitting area 144b is equal to 100 percent. The transmitting area 144b is formed as a circular hole at a central portion of the beam splitter 144 that is surrounded by the reflective area 144a.

In FIG. 7, a vertical direction corresponds to the auxiliary scanning direction (Z axis direction), and a horizontal direction corresponds to the main scanning direction (Y' axis direction, the Y' axis is different from the Y axis in that the beam splitter 144 is positioned at an angle with respect to the Y axis).

The laser beams emitted from the 8 point laser sources (FIG. 5) at the exit end surfaces 121b to 128b of the optical fibers 121 to 128 are formed into a roughly rectangular shape when passing through the aperture 142 (FIG. 4). The laser beams overlap into essentially a single rectangular area which is incident on the beam splitter 144. The incident range L of the laser beams on the beam splitter 144 is shown in FIG. 7.

A portion of the laser beams, incident to the reflective area 144a, is reflected toward the polygon mirror 180 as the main beam. Meanwhile, the other portion, incident to the transmitting area 144b, passes through to the Automatic Power Control (APC) sensor system 150 as the monitor beam. The APC sensor system 150 detects the amount of light and generates signals for control of the output from the semiconductor lasers 101 to 108. In this embodiment, the area of the transmitting area 144b is, for example, determined such that 5% of the intensity of the total incident laser beams is transmitted to the APC sensor system 150 as the monitor beam.

As shown in FIG. 4, the laser beams incident to the APC sensor system 150 are converged by the collective lens 151, and then received by the APC light receiving element 155.

During operation, each of the semiconductor lasers 101 to 108 separately emits a laser beam at the beginning of each main scan before the respective beam spot formed enters the image forming region. Thus, a portion of each laser beam is sequentially directed to the APC sensor system 150.

The output from the APC sensor system 150 is input to an APC signal generating circuit (not shown). Based on this input, the APC signal generating circuit generates an APC signal that is sent to each of respective semiconductor laser driving circuits (not shown) that drive each semiconductor laser 101 to 108. For example, the APC signal output from the APC signal generating circuit during a period when the APC sensor system 150 is receiving the laser beam from the first semiconductor laser 101, is input to a first semiconductor laser driving circuit (not shown) that drives the first semiconductor laser 101. The APC signal is used by each of the semiconductor laser driving circuits to set the gain to a standard level of output from the respective semiconductor lasers.

When the beam spots enter the image forming region, each semiconductor laser driving circuit controls the respective semiconductor laser 101 to 108 based on an input image forming signal and using a driving voltage that is adjusted by the gain set based on the APC signal. The arrangement above, thus allows the output from the semiconductor lasers 101 to 108 to be controlled so as to maintain a standard level of intensity of respective beam spots on the surface of the photoconductive drum 210.

As explained above, since the transmitting area 144b is formed as a hole in the reflective area 144a, the distribution ratio between the main and monitor beams is unaffected by polarization. Thus, the output of the APC light receiving element 155 can therefore accurately correspond to the total amount of the laser beams and the intensity of the main beam can be accurately controlled based on the output of the APC light receiving element 155.

For the main beam, the formation of the transmitting section 144b in this way generates diffraction in the laser beams reflected by the reflective section 144a, thus altering the distribution of the light intensity of the laser beams that form the beam spots formed on the image forming surface.

Figure 8:
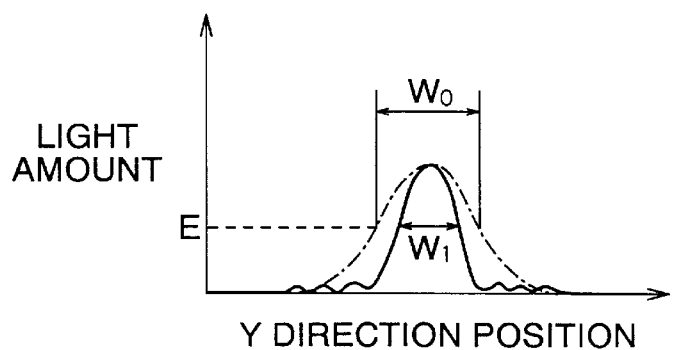
FIG. 8 is a graph showing a laser beam distribution produced by the beam splitter of FIG. 7.

FIG. 8 shows the light distribution in the main scanning direction (Y axis direction) on the image forming surface without the transmitting area 144b (alternating dash-dotted line) and with the transmitting area 144b (solid line). The dashed line E shown in FIG. 8 represents the threshold level of light intensity of light to form a latent image on the photoconductive drum 210. As shown in FIG. 8, when the transmitting area 144b is provided, diffraction occurs producing a main lobe that is narrower than that when the transmitting area 144b is not provided and also producing side lobes which have an intensity that is lower than the threshold level E. That is, the beam spot size (W1) when the transmitting area 144b is provided is smaller than the beam spot size (W0) when the transmitting area 144b is not provided.

Based on the above, if the beam splitter 144 is used in a scanning optical device without altering the f-number of the optical system, then the beam spot size is reduced by the diffraction. However, according to this first embodiment, the f-number of the system is increased to offset the reduction in the beam spot size by diffraction.

Figure 9:
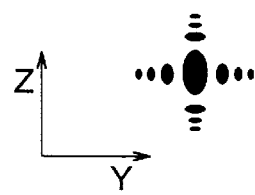
FIG. 9 is a drawing of a beam spot shape produced by the beam splitter of FIG. 7.

FIG. 9 shows the shape of a beam spot corresponding to FIG. 8. In general, a beam spot formed on the image surface is elliptical, having a larger dimension in the auxiliary scanning direction as shown in FIG. 9. Such a shape is determined by setting a smaller f-number in the main scanning direction than the f-number in the auxiliary scanning direction. Also, as the f-number decreases, the spot size becomes smaller and a focal depth becomes larger. In particular, the f-number is obtained by dividing a focal length f by an aperture diameter D (f-number=f/D). Thus, for this embodiment, the size of the aperture 142 in the main scanning direction is larger than that in the auxiliary scanning direction in order to form the above-mentioned elliptical beam spot.

In order to obtain the same spot size W0 when using the beam splitter 144 (i.e. when diffraction is generated), the f-number of the optical system is set at a larger value than that when the beam splitter 144 is not used (i.e. in a system where there is no similar diffraction generated). That is, the aperture 142 is formed to be smaller than an aperture that would be used if the beam splitter 144 were not used (i.e. in a system where there is no similar diffraction generated).

As a result of the above-mentioned setting, the focal depth of the scanning optical device is increased while maintaining an appropriate spot size. As the focal depth increases, the amount of change of the spot size with respect to the position of the image surface along the direction of the laser beams decreases. Thus, the beam spot size will not change significantly if there is some curvature of field of the fθ lens 190 in both the main and auxiliary scanning directions or if there is some displacement of the photoconductive drum 210 along the optical axis.

A scanning optical device according to a second embodiment is now described with reference to FIGS. 10 and 11. In this embodiment, the beam splitter 144 of the first embodiment is replaced with a beam splitter 244, all other elements are the same as, and arranged the same as in the first embodiment.

Figure 10:
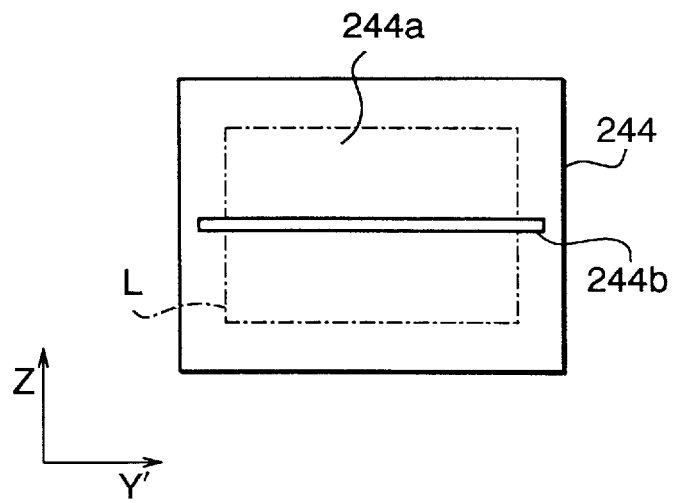
FIG. 10 is a front view of a beam splitter of a second embodiment.

As shown in FIG. 10, the beam splitter 244 consists of a reflective area 244a which is, for example, a rectangular mirror, and a transmitting area, which, in this example is a slit 244b formed in the main scanning direction (Y' axis direction) at the center of the reflective area 244a. As in the first embodiment, the area of the slit 244b is determined such that 1/20 of the light quantity is transmitted as the monitor beam.

Figure 11:
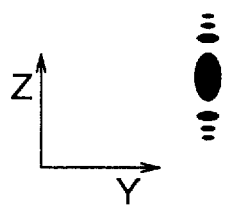
FIG. 11 is a drawing of a beam spot shape produced by the beam splitter of FIG. 10.

FIG. 11 shows the shape of a beam spot formed on the image forming surface using the beam splitter 244. As shown in FIG. 11, diffraction is generated only in the auxiliary scanning direction. Here, if the f-number is left the same as that when the diffraction does not occur, the beam spot size would be smaller in the auxiliary scanning direction due to diffraction. However, according to this second embodiment, a larger f-number in the auxiliary scanning direction is set to offset the reduction in the beam spot size by diffraction. Thus, as above, a greater focal depth in the auxiliary scanning direction is provided.

In a scanning optical device that is provided with a cylindrical lens between a laser source and a polygon mirror such as the embodiment, the power of the fθ lens in the auxiliary scanning direction is larger than that in the main scanning direction. Thus the curvature of field may be larger in the auxiliary scanning direction than in the main scanning direction. Consequently, the advantage of greater depth in the auxiliary scanning direction according to this second embodiment is particularly effective.

In addition, the beam splitter 244 is easier to manufacture than the beam splitter 144 of the first embodiment. For example, the beam splitter 244 could be formed by placing two mirrors at a spacing required to form the slit 244b rather than forming the slit 244b in the reflective area 244a.

A scanning optical device according to a third embodiment is now described with reference to FIGS. 12 and 13. In this embodiment, the beam splitter 144 of the first embodiment is replaced with a beam splitter 344, all other elements are the same as, and arranged the same as in the first embodiment.

Figure 12:
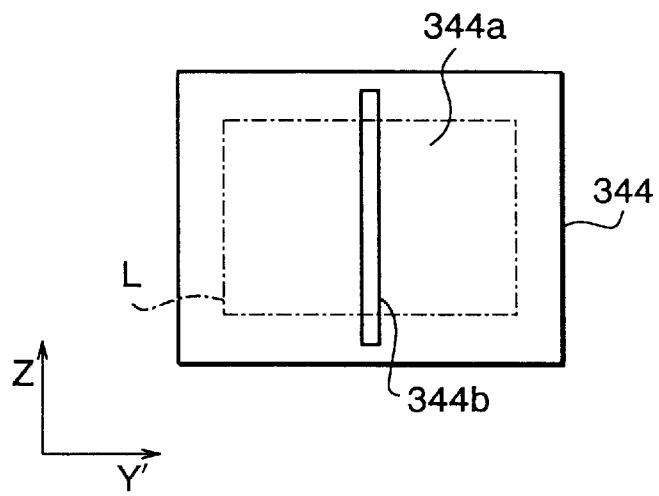
FIG. 12 is a front view of a beam splitter of a third embodiment.

As shown in FIG. 12, the beam splitter 344 consists of a reflective area 344a which is, for example, a rectangular mirror, and a transmitting area, which, in this example is a slit 344b formed in the auxiliary scanning direction (Z axis direction) at the center of the reflective area 244a. As in the first embodiment, the area of the slit 344b is determined such that ½₀ of the light quantity is transmitted as the monitor beam.

Figure 13:
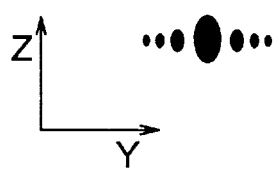
FIG. 13 is a drawing of a beam spot shape produced by the beam splitter of FIG. 12.

FIG. 13 shows the shape of a beam spot formed on the image forming surface using the beam splitter 344. As shown in FIG. 13, diffraction is generated only in the main scanning direction. Here, if the f-number were left the same as if diffraction did not occur, the beam spot size would be smaller in the main scanning direction due to diffraction. However, according to this third embodiment, a larger f-number in the main scanning direction is set to offset the reduction in the beam spot size by diffraction. Thus, as above, a greater focal depth in the main scanning direction is provided. As mentioned above, since the f-number is set smaller in the main scanning direction to obtain a small spot size, the focal depth in the main scanning direction is larger than that in the auxiliary scanning direction in general. In other words, if the photoconductive drum 210 is displaced along the optical axis, the spot size in the main scanning direction is charged more than in the auxiliary scanning direction. Thus, the allowance of the displacement of the photoconductive drum is limited by the focal depth in the main scanning direction. According to the third embodiment, the focal depth in the main scanning direction becomes larger, and thus, amount of allowable displacement of the photoconductive drum 210 along the optical axis is larger.

The beam splitter 344 of the third embodiment is also easier to manufacture than the beam splitter 144 of the first embodiment since the beam splitter 344 may be formed by placing two mirrors at a spacing required to form the slit 344b rather than forming the slit 344b in the reflective area 344a.

As explained above, the scanning optical device according to the embodiments is designed such that the laser beams can be divided by a beam splitter in such a way that a portion of the laser beams that is not affected by polarization is sent to an APC sensor system. In this way, the amount of light may be accurately detected by the APC sensor system for power control.

In particular, the beam splitter is formed with a hole or slit through which the laser beams pass to the APC sensor system. However, a similar effect can be produced when the transmittance of the transmitting area and the reflectivity of the reflective area are higher than about 90 percent. Thus, a glass plate may be used as the transmitting area.

In addition, the scanning optical device according to the embodiments enables greater focal depth on the image forming surface due to the diffraction effect caused by the hole or slit in the beam splitter.

Although the structure and operation of a scanning optical device is described herein with respect to the preferred embodiments, many modifications and changes can be made without departing from the spirit and scope of the invention.

The present disclosure relates to subject matter contained in Japanese Patent Application Nos. HEI 8-037266, filed on Jan. 31, 1996, and HEI 8-045442, filed on Feb. 7, 1996, which are expressly incorporated herein by reference in their entirety.

What is claimed is:

1. A scanning optical device, comprising:
   a laser source that emits a laser beam;
   a deflector that deflects and scans said laser beam;
   a beam splitter, positioned between said laser source and said deflector, that comprises a reflective area in which said laser beam from said laser source is reflected and a transmitting area that is distinct from said reflective area through which said laser beam is transmitted, wherein one of said reflected laser beam and said transmitted laser beam is a main beam deflected by said deflector, an other of said one of said reflected light flux and said transmitted light flux being a monitor beam; and
   a sensor that detects an intensity of said monitor beam.

2. The scanning optical device according to claim 1, wherein said reflectivity of said reflective area and said transmittance of said transmitting area are larger than 90 percent.

3. The scanning optical device according to claim 1, further comprising a controller that controls a power of said laser beam emitted from said laser source in accordance with said intensity of said monitor beam detected by said sensor.

4. The scanning optical device according to claim 1, wherein said reflected laser beam is said main beam and said transmitted laser beam is said monitor beam.

5. The scanning optical device according to claim 1, wherein said transmitting area is formed as an opening through which said laser beam passes.

6. The scanning optical device according to claim 1, wherein said transmitting area is formed in a central portion of said beam splitter and said reflecting area is formed to surround said transmitting area.

7. The scanning optical device according to claim 6, wherein said transmitting area has a circular shape.

8. The scanning optical device according to claim 1, wherein said transmitting area has a rectangular shape in which the long sides extend along a main scanning direction.

9. The scanning optical device according to claim 1, wherein said transmitting area has a rectangular shape in which long sides extend along an auxiliary scanning direction.

10. The scanning optical device according to claim 1, further comprising an optical fiber that transmits said laser beam emitted from said laser source to said beam splitter.

11. The scanning optical device according to claim 1, said laser source comprising a plurality of laser sources emitting laser beams.

12. The scanning optical device according to claim 11, further comprising a plurality of optical fibers that transmit said laser beams emitted from said plurality of laser sources to said beam splitter.

13. The scanning optical device according to claim 1, further comprising a scanning lens that converges said laser beam deflected by said deflector.

14. A scanning optical device, comprising:
 a laser source that emits a laser beam;
 a polygon mirror that deflects and scans said laser beam;
 a beam splitter, positioned between said laser source and said deflector, that divides said laser beam into a reflecting laser beam and a transmitting laser beam without being affected by a polarization of said laser beam, wherein one of said reflected laser beam and said transmitted laser beam is a main beam to be deflected by said polygon mirror, an other of said one of said reflected light flux and said transmitted light flux is a monitor beam; and
 a sensor that detects an intensity of said monitor beam.

15. The scanning optical device according to claim 14, said beam splitter comprising a reflective area in which said laser beam from said laser source is reflected and a transmitting area that is distinct from said reflective area through which said laser beam is transmitted, wherein said reflectivity of said reflective area and said transmittance of said transmitting area are larger than 90 percent.

16. The scanning optical device according to claim 14, further comprising a controller that controls a power of said laser beam emitted from said laser source in accordance with a power of said monitor beam detected by said sensor.

17. The scanning optical device according to claim 14, wherein said reflected laser beam is said main beam and said transmitted laser beam is said monitor beam.

18. The scanning optical device according to claim 14, wherein said transmitting area is formed as an opening through which laser beam passes.

19. The scanning optical device according to claim 14, further comprising an optical fiber that transmits said laser beam emitted from said laser source to said beam splitter.

20. The scanning optical device according to claim 14, wherein a plurality of laser sources are provided.

21. The scanning optical device according to claim 20, further comprising a plurality of optical fibers for transmitting said laser beams emitted from said plurality of said laser sources to said beam splitter.

* * * * *